(12) United States Patent
Suo et al.

(10) Patent No.: US 9,014,095 B2
(45) Date of Patent: Apr. 21, 2015

(54) METHOD AND APPARATUS FOR SAVING ENERGY IN MOBILE COMMUNICATION SYSTEM BASE STATION

(75) Inventors: Shiqiang Suo, Beijing (CN); Bo Han, Beijing (CN); Zhuo Gao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 149 days.

(21) Appl. No.: 13/700,985

(22) PCT Filed: Jul. 19, 2011

(86) PCT No.: PCT/CN2011/077299
§ 371 (c)(1),
(2), (4) Date: Nov. 29, 2012

(87) PCT Pub. No.: WO2012/010074
PCT Pub. Date: Jan. 26, 2012

(65) Prior Publication Data
US 2013/0070635 A1   Mar. 21, 2013

(30) Foreign Application Priority Data

Jul. 20, 2010   (CN) .......................... 2010 1 0234567

(51) Int. Cl.
H04W 52/02 (2009.01)
H04W 88/08 (2009.01)
H04W 72/00 (2009.01)

(52) U.S. Cl.
CPC ........ *H04W 52/0206* (2013.01); *H04W 88/085* (2013.01); *H04W 72/005* (2013.01); *Y02B 60/50* (2013.01)

(58) Field of Classification Search
CPC ............ H04W 52/0206; H04W 52/02; H04W 52/0241; H04W 52/0232; H04W 28/18; H04W 24/02; H04W 72/0005; H04B 7/0691; H04B 24/08
USPC ......... 370/252, 229, 241, 311, 338, 328–331, 370/389–390, 432; 455/500, 129
See application file for complete search history.

(56) References Cited

U.S. PATENT DOCUMENTS

2010/0303013 A1* 12/2010 Khandekar et al. ........... 370/328
2012/0020421 A1*  1/2012 Larsson et al. ................ 375/260

(Continued)

FOREIGN PATENT DOCUMENTS

CN   101179814 A   5/2008
CN   101299841 A   11/2008

(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 9)"; 3GPP Standard; 3GPP TS 36.211; 3rd Generation Partnership Project (3GPP) Mobile Competence Centre; 650; Route Des Lucioles; F-06921 Sophia-Antipolis Cedex; France, No. V9.1.0; Mar. 21, 2010; 86 pgs.

(Continued)

*Primary Examiner* — Bob Phunkulh
*Assistant Examiner* — Rose Clark
(74) *Attorney, Agent, or Firm* — Foley & Lardner LLP (57) ABSTRACT

A method for achieving energy-saving in a mobile communication system base station, for application in an LTE system, comprising: determining the average value of a downlink sub-frame traffic load; determining, when the average value of the downlink sub-frame traffic load is below a threshold value therefore, an MBSFN downlink sub-frame which is not carrying multicast traffic; and closing the radio frequency channel corresponding to the multicast symbol in the MBSFN downlink sub-frame which is not carrying multicast traffic. By using the method, the number of downlink sub-frames required to meet the communication traffic needs of a current cell is judged according to changes in the traffic load observed by measuring the traffic load values in that cell; sub-frames which can be closed are set as MBSFN downlink sub-frames which do not send multicast traffic; radio frequency channels occupied by the multicast symbol are closed, thereby reducing energy consumption.

17 Claims, 3 Drawing Sheets

(56) References Cited

U.S. PATENT DOCUMENTS

2012/0094661 A1* 4/2012 Frenger et al. .............. 455/434
2012/0315948 A1* 12/2012 Frenger et al. .............. 455/522
2013/0021909 A1* 1/2013 Bader ........................ 370/237
2014/0161017 A1* 6/2014 Lee et al. ................... 370/312

FOREIGN PATENT DOCUMENTS

CN        101742516 A     6/2010
CN        101754336 A     6/2010

OTHER PUBLICATIONS

Huawei; "Energy saving techniques for LTE"; 3GPP Draft; R2-101213 Energy Saving Techniques for LTE, 3rd Generation Partnership Project(3GPPP), Mobile Competence Centre; 650; Route Des Lucioles; F-06921 Sophia-Antipolis Cedex; France, vol. RAN WG2, no. San Francisco, USA; Feb. 22, 2010, Feb. 16, 2010; 6 pgs.

Huawei; "Energy saving techniques for LTE"; 3GPP Draft; R2-101824 Energy Saving Techniques for LTE, 3rd Generation Partnership Project(3GPPP), Mobile Competence Centre; 650; Route Des Lucioles; F-06921 Sophia-Antipolis Cedex; France, vol. RAN WG2, no. San Francisco, USA; Feb. 22, 2010, Feb. 24, 2010; 9 pgs.

Office Action in EP No. 11809262.6; issued Apr. 10, 2013; 9 pgs.

Supplementary European Search Report in EP No. 11809262.6; issued Mar. 7, 2013; 5 pgs.

International Search Report issued in related International Patent Application No. PCT/CN2011/077299, completed Oct. 10, 2011.

3GPP TSG-RAN WG1 #59. "Extended cell DTX for enhanced energy-efficient network operation". R1-095011, Nov. 9-13, 2009 (6 pgs.)

3GPP TS 36.331 V9.2.0 (Mar. 2010). Technical Specification Group Radio Access Network; Evolved Universal Terrestrial Radio Access (E-UTRA); Radio Resource Control (RRC); Protocol specification (Release 9) (236 pgs.).

* cited by examiner

METHOD AND APPARATUS FOR SAVING ENERGY IN MOBILE COMMUNICATION SYSTEM BASE STATION

CROSS REFERENCE TO RELATED APPLICATIONS

This application is a US National Stage of International Application No. PCT/CN2011/077299, filed Jul. 19, 2011, designating the United States, and claiming the benefit of Chinese Patent Application No. 201010234567.7, filed with the Chinese Patent Office on Jul. 20, 2010 and entitled "Method and apparatus for energy saving of base station in mobile communication system", both of which are hereby incorporated by reference in their entireties.

FIELD

The present invention relates to the field of mobile communications and particularly to a method and apparatus for energy saving of a base station in a mobile communication system.

BACKGROUND

From the perspective of an energy consumption distribution in a mobile communication network system, a base station facility takes up the largest proportion up to 90% of energy consumption and a core network facility, a network administration device and other devices take up only no more than 10% of energy consumption throughout the mobile network. A primary base station device takes up approximately 50% and an air conditioner and other heat sinks in a facility house take up approximately 45% of energy consumption in the base station facility.

In order to lower energy consumption and build a green mobile communication network, the following three technical aspects are primarily taken into account:

1. In terms of a design for the primary base station device, a high-efficiency digital power amplifiers and other new technologies are applied, a distributed base station, a large-capacity base station and other new products are introduced, more flexibility deployment is supported, a plurality of systems are applicable, and the utilization ratio of a hardware facility is improved;

2. In terms of building of the facility house, the base station is altered with intelligent ventilation, e.g., a direct ventilation application, self-heat radiation, etc., an integrated facility house is adopted, and a requirement of the facility house on the heat sinker is lowered; and 3. In terms of an energy source application, the proportion of solar power, wind power, methane and other green and clear energy sources is improved.

Particularly the energy-saving design and application of the primary base station device is crucial. With effectively lowered energy consumption of the primary base station device, the dependency of the device upon an environment of the facility house can also be lowered effectively, and a load of a supporting power source and the air conditioner of the facility house can be lowered greatly, thereby further lowering effectively the total energy consumption.

Throughout the primary base station device, the majority of energy is consumed by a power amplifier of a base station transmitter, and how to lower the energy consumption and heat generation of the power amplifier while guaranteeing a linearity index of the power amplifier is crucial for lowering the energy consumption of the entire device and saving energy.

For the purpose of energy saving and lowered consumption, fined management of resources has to be performed throughout network management of mobile communication, for example, disabling of some carrier frequencies may be considered in some areas with a relatively small number of users in a specific period of time (e.g. 10 p.m. to 5 a.m.) while satisfying an essential communication demand to thereby lower energy consumption effectively.

The technical development has imposes a higher energy-saving requirement on fined management of a mobile communication system. How to manage energy consumption of a base station device more finely and to lower unnecessary energy consumption will become an important task in designing and implementing the system in the future. An Long Term Evolution (LTE) system will be increasingly applied as a next-generation mobile communication system in the future, and lowered energy consumption of the LTE system will be significant to build a green mobile communication network.

SUMMARY

Embodiments of the invention primarily directed to an LTE system propose a method and apparatus for energy saving of a base station by disabling a downlink sub-frame using a Multicast Broadcast Single Frequency Network (MBSFN) sub-frame.

An embodiment of the invention provides a method for energy saving of a base station in a mobile communication system, the method including the operations of:

determining a traffic load average of downlink sub-frames;

determining an MBSFN downlink sub-frame in which no multicast service is borne when the traffic load average of downlink sub-frames is below a downlink sub-frame traffic load threshold; and disabling a radio frequency channel corresponding to multicast symbols in the MBSFN downlink sub-frame in which no multicast service is borne.

An embodiment of the invention provides a base station apparatus including a base station scheduler and a baseband data processing unit, where the base station apparatus further includes a statistic unit, a determination unit, a decision unit, a radio frequency channel disablement information obtainment unit and a radio frequency channel disabling unit, and where:

the statistic unit is configured to collect and make a statistic of downlink traffic load information of the base station and to report statistic result information at a preset periodicity, where the preset periodicity is an integer multiple of 10 ms;

the determination unit is configured to determine whether to set an MBSFN downlink sub-frame in which no multicast service is borne according to the downlink traffic load information reported from the statistic unit;

the decision unit is configured to determine a downlink sub-frame which is set to the MBSFN sub-frame;

the radio frequency channel disablement information obtainment unit is configured to detect radio frequency channel disablement information and to generate and transmit an instruction to disable a radio frequency channel; and the radio frequency channel disabling unit is configured to perform an operation of disabling the radio frequency channel according to the instruction of the radio frequency channel disablement information obtainment unit.

An embodiment of the invention further provides a Radio Remote Unit, RRU, apparatus including a baseband data reception unit, where the RRU apparatus further includes a radio frequency channel disablement information obtainment unit and a radio frequency channel disabling unit, and where:

the radio frequency channel disablement information obtainment unit is configured to detect radio frequency channel disablement information and to generate and transmit an instruction to disable a radio frequency channel; and the radio frequency channel disabling unit is configured to perform an operation of disabling the radio frequency channel according to the instruction of the radio frequency channel disablement detection unit.

In the embodiments of the invention, a traffic load value of a cell is measured, and the number of downlink sub-frames required to satisfy a current communication service of the cell is determined according to a change in traffic load; and a sub-frame that can be disabled is set to an MBSFN sub-frame in which no multicast service is borne and a radio frequency channel corresponding to the multicast symbols is disabled for the purpose of lowered energy consumption.

DETAILED DESCRIPTION OF THE EMBODIMENTS

An embodiment of the invention primarily directed to a Long Term Evolution (LTE) system proposes a method for lowering energy consumption by setting a downlink sub-frame that can be disabled to an MBSFN sub-frame in which no multicast service is borne and disabling a radio frequency channel corresponding to MBSFN multicast symbols.

In a method for energy saving of a base station according to an embodiment of the invention:

A traffic load average of downlink sub-frames is determined;

An MBSFN downlink sub-frame in which no multicast service is borne is determined when the traffic load average of downlink sub-frames is below a downlink sub-frame traffic load threshold; and A radio frequency channel corresponding to multicast symbols in the MBSFN downlink sub-frame in which no multicast service is borne is disabled.

A radio frequency channel includes a small signal portion and a large signal portion, where the small signal portion includes a digital to analog converter, an analog transceiver and other analog devices, and the large signal portion includes a power amplifier. No or little data is transmitted in a part of downlink sub-frames in a lightly loaded cell. A radio frequency channel is still in an operating status even in the case that no radio frequency signal is transmitted in the radio frequency channel, and energy consumed in this case is consumed as a thermal loss instead of being converted into a useful radio frequency signal. Thus from the perspective of guaranteed respective Quality of Services (QoSs), a base station in operation detects in real time the amount of traffic borne in a cell and obtains the traffic load average of downlink sub-frames, and when the traffic load average of downlink sub-frames is below a specific threshold, the base station can further determine the number of downlink sub-frames required to satisfy a current communication service of the cell, set the remaining sub-frames to MBSFN sub-frames and disable radio frequency channel(s) corresponding to multicast symbols in the corresponding MBSFN sub-frames in which no data is borne for the purpose of lowered energy consumption.

Preferably both the number of the MBSFN sub-frames and the downlink sub-frame traffic load threshold are related to an average amount of data that can be borne in one sub-fame:

Downlink sub-frame traffic load threshold=Average amount of data borne in downlink sub-fame*$\eta$, where $\eta$ represents a preset load factor.

Given a number K_DL of downlink sub-frames in a period of time, the technology of disabling a downlink sub-frame using an MBSFN sub-frame can be initiated if the traffic load average of downlink sub-frames is below the downlink sub-frame traffic load threshold×(K_DL−1)/K_DL; and a number m of MBSFN sub-frames can be set at most if the traffic load average of downlink sub-frames is below the downlink sub-frame traffic load threshold×(K_DL−m)/K_DL, where m<K_DL.

The traffic load average of downlink sub-frames can be determined by monitoring in real time a capacity index. For example, the amount of data in a downlink data buffer is obtained through being monitored in real time, or the statistical average of the amounts of data in the downlink data buffer is obtained (with a statistic period being an integer multiple of 10 ms), and the traffic load average of downlink sub-frames is determined according to a proportional relationship between the obtained amount of data and the number of downlink sub-frames in use.

MBSFN sub-frame(s) in which no multicast service is borne shall be determined also taking into account an influence of a common channel, e.g., broadcast, paging, synchronization signalling, etc.

Figure 1:
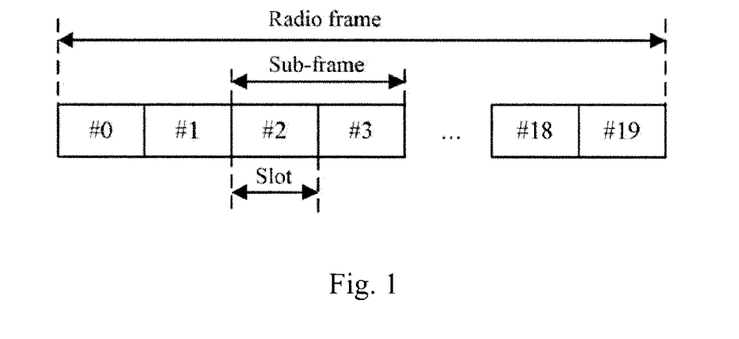
FIG. 1 is a schematic structural diagram of a first type of radio frame of an LTE system.

As specified by the $3^{rd}$ generation mobile communication system standardization organization (3GPP), two radio frame structures are supported in an LTE system with a 3G radio interface:

A. A first type of radio frame (simply referred below to as Type1) is applicable to a Frequency Division Duplex (FDD) system and structured as illustrated in FIG. 1, where:

The Type1 has a frame length of 10 ms and is composed of 20 slots each with a length of 0.5 ms, numbered #0 to #19 in FIG. 1. Every two consecutive slots are defined as a sub-frame, and there are 10 sub-frames in total, that is, a sub-frame i is composed of the slots 2$i$ and the 2$i$+1, where i=0, 1, 2, . . . , 9.

When the Type1 is applied to the FDD system, 10 sub-frames are available in both the uplink and the downlink in each 10 ms period of time because the uplink and the downlink of the FDD system are separate in the frequency domain.

Figure 2:
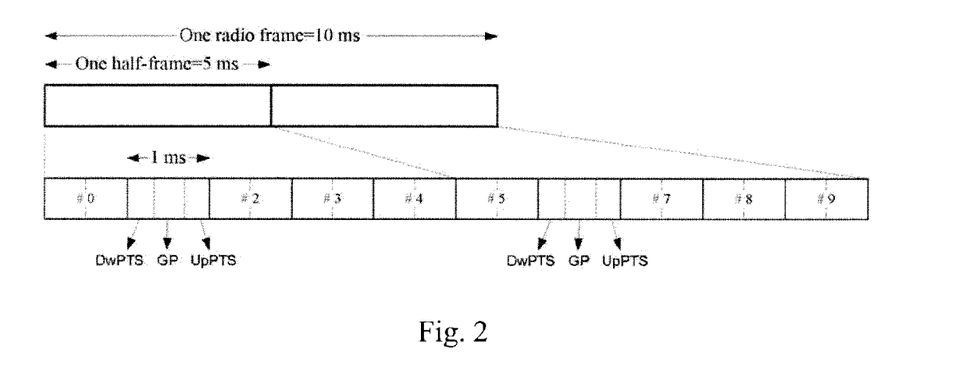
FIG. 2 is a schematic structural diagram of a second type of radio frame of an LTE system.

B. A second type of radio frame (simply referred below to as Type2) is applicable only to a Time Division Duplex (TDD) system and structured as illustrated in FIG. 2, where:

The radio frame has a frame length of 10 ms, and each frame is divided into two 5 ms half-frames. Each 5 ms half-frame is divided into eight normal slots each with a length of 0.5 ms and one special slot area with a length of 1 ms, and the 1 ms special slot area is composed of a Downlink Pilot Time Slot (DwPTS), a Guard Period (GP) and an Uplink Pilot Time Slot (UpPTS); and also each two normal slots are paired into a sub-frame, where a sub-frame #0 and the downlink pilot time slot are always used for downlink transmission, and the uplink pilot time slot is always used for uplink transmission. Seven configuration patterns are currently defined for the frame structure of the LTE-TDD system as depicted in Table 1:

TABLE 1

| Uplink and Downlink Configuration | Switching Periodicity | Sub-Frame Numbers | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Where D represents a normal downlink sub-frame, U represents a normal uplink sub-frame, and S represents a special sub-frame. Proportion configuration of downlink/uplink sub-frames of a cell has been defined in planning cell networking and thereafter will substantially not be altered.

In the LTE system, downlink control channels include a Physical Control Format Indicator Channel (PCFICH), a Physical Hybrid ARQ Indicator Channel (PHICH) and a Physical Downlink Control Channel (PDCCH).

The PCFICH carries information about the number (1, 2, 3 or 4) of Orthogonal Frequency Division Multiplexing (OFDM) symbols in a sub-frame, which are used for transmission of the PDCCH. The PCFICH is transmitted in a first symbol of a downlink sub-frame, and a User Equipment (UE) shall determine a time-length span (in number of OFDM symbols) of DCI before demodulating the control information. The system represents the number of OFDM symbols occupied by the PDCCH with a Control Format Indicator (CFI)=1, 2 or 3. With $N_{RB}^{DL}>10$ ($N_{RB}^{DL}$ represents a downlink bandwidth of the LTE system), the time-length span of the DCI may be 1, 2 or 3 and characterized by the value of the CFI. With $N_{RB}^{DL} \leq 10$, the time-length span of the DCI may range from 2 OFDM symbols to 4 OFDM symbols and at this time is characterized by the CFI plus 1. The PCFICH is present when the number of symbols occupied by the PDCCH is above zero. 2-bit information of the PCFICH is encoded into 32 bits and modulated using Quadrature Phase Shift Keying (QPSK), and the PCFICH is mapped at four Resource Element Groups (REGs) (i.e., four consecutive physical resource units) other than reference symbols in the first OFDM symbol of the downlink sub-frame, and the four REGs mapping the PCFICH are distributed throughout the system bandwidth at a uniform interval.

The PHICH contains ACK/NACK feedback information corresponding to a Physical Uplink Shared Channel (PUSCH). A plurality of PHICHs are mapped onto the same resource element as a group of PHICH mapped onto physical resource elements in which neither reference signal nor PCFICH is transmitted.

The PDCCH bears scheduling and other control information generally including allocation information of Uplink Shared Channel (UL-SCH) and Downlink Shared Channel (DL-SCH) and Transmit Power Control (TPC) information of a PUCCH and the PUSCH respectively. The PDCCH occupies the first N OFDM symbols of a sub-frame, where the value of N can be 1, 2, 3 or 4.

Figure 3:
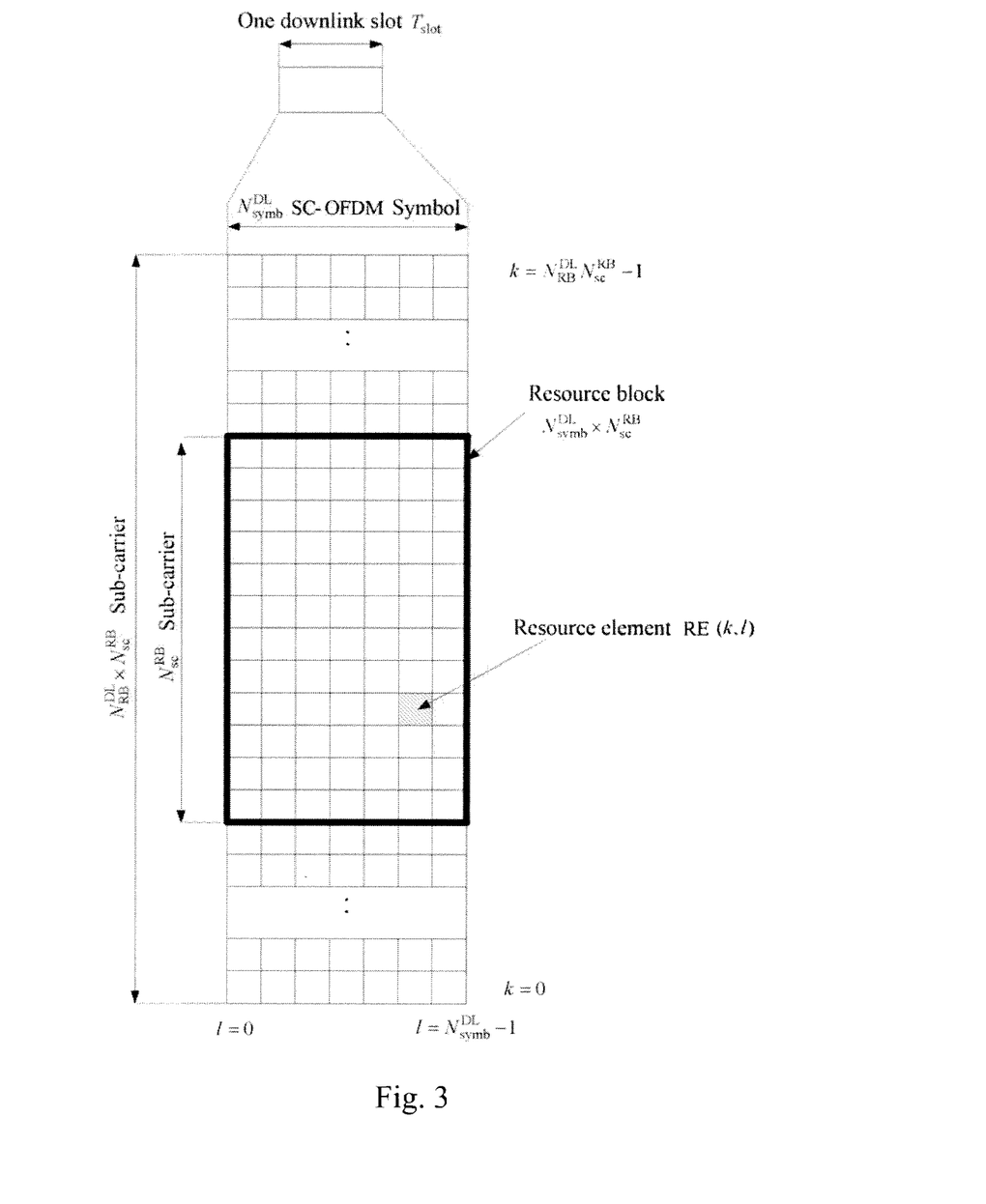
FIG. 3 is a schematic diagram of a downlink physical resource of an LTE system.

As illustrated in FIG. 3, the smallest resource unit used by the LTE system for transmission is a Resource Element (RE), and several resource elements constitute a Resource Block (RB). A downlink physical channel corresponds to a set of a series of resource elements to bear higher-layer information.

A Primary Synchronization Channel (PSCH), a Secondary Synchronization Channel (SSCH) and a Physical Broadcast Channel (PBCH) among downlink physical channels belong to channels at a cell level and are provided with defined resource locations specified in the standard as follows:

For the FDD system, the PSCH is located on 72 sub-carriers at the middle of the last OFDM symbols in the slot 0 and the slot 10; and for the TDD system, the PSCH is located on 72 sub-carriers at the middle of the $3^{rd}$ OFDM symbols in the sub-frame 1 and the sub-frame 6.

For the FDD system, the SSCH is located on 72 sub-carriers at the middle of the second last OFDM symbols in the slot 0 and the slot 10; and for the TDD system, the SSCH is located on 72 sub-carriers at the middle of the last OFDM symbols in the sub-frame 1 and the sub-frame 11.

The PBCH is located on 72 sub-carriers at the middle of the first four symbols in the slot 1 of the sub-frame 0.

Moreover for the FDD system, the sub-frame 0, the sub-frame 4, the sub-frame 5 and the sub-frame 9 may be used for paging and can not be set to an MBSFN sub-frame; and for the TDD system, the sub-frame 0, the sub-frame 1, the sub-frame 5 and the sub-frame 6 may be used for paging and can not be set to an MBSFN sub-frame, and the sub-frame 2 is set to an uplink sub-frame all the time and can not be set to an MBSFN sub-frame.

For the FDD, MBSFN sub-frames available in each radio frame are #1, #2, #3, #6, #7 and #8 corresponding to 6 bits of a bitmap.

For the TDD, MBSFN sub-frames available in each radio frame are #3, #4, #7, #8 and #9 corresponding to the first 5 bits of a bitmap, and the last bit of the bitmap is unused. It shall be noted that an uplink sub-frame can not be allocated to an MBSFN sub-frame.

In the LTE system, there is a binding relationship between the locations of the PDCCH and the PUCCH in the time domain and thus also between the locations of the PUSCH and the PHICH in the time domain, and uplink and downlink sub-frames shall be scheduled collectively so that no information will be borne in a control area of the downlink sub-frames. If a downlink sub-frame to be set to an MBSFN sub-frame has borne downlink data of another service, then the downlink sub-frame shall be scheduled by transferring the data borne therein to another available downlink sub-frame for transmission or allocating no data to the downlink sub-frame.

In the LTE system, an operation of disabling a downlink sub-frame can be performed if there is no control channel in the downlink sub-frame; and an operation of disabling a slot in a downlink sub-frame can be performed if there is a control channel in the downlink sub-frame but no downlink shared channel information is borne in the sub-frame. For this operation, signalling information is required for the base station to signal the user equipment that the base station transmits no cell-specific reference signal, or the user equipment is required to be provided with a function to detect blindly that the base station transmits no cell-specific reference signal or with a corresponding mechanism to process an error of demodulating a cell-specific reference signal.

Furthermore in a cell supporting uni-cast transmission, a cell-specific reference signal is transmitted in all the downlink sub-frames and distributed throughout the system bandwidth range. The user equipment obtains samples of a channel frequency response on different OFDM symbols and on different sub-carriers from the received cell-specific reference signal and further obtains a channel frequency response of respective REs throughout the time and frequency plane or REs in a part of the time and frequency range as needed in an interpolation algorithm to thereby evaluate status information of the entire channel. If a sub-frame or a slot is disabled directly, then extra signalling information is required to signal the user equipment; otherwise, the user equipment will not know that the base station transmits no cell-specific reference signal and may demodulate a cell-specific reference signal in error. At present this signalling mechanism is not supported in the standard and it will be difficult to modify the standard. If there is no extra signalling information to signal the user equipment, then the user equipment is required to be provided with a function to detect blindly a PCFICH and identify that no CFI information is transmitted in the downlink, and the user equipment will not receive and demodulate any cell-specific reference signal upon blind detection of that no CIF information is borne in the downlink sub-frame.

An MBSFN sub-frame is a sub-frame distinguished from a uni-cast sub-frame, where the first one or two symbols are uni-cast symbols for boring control information, and only the remaining part that follows is really used as multicast symbols for MBSFN transmission. There are two pieces of Radio Resource Control (RRC) signalling related to an Evolved Multimedia Broadcast Multicast Service (eMBMS): Multimedia Broadcast Multicast Service (MBMS)-specific System Information Block Type13 (SIB13) transmitted on a Broadcast Control Channel (BCCH), and an MBSFN area configuration message borne on a Multicast Control Channel (MCCH).

An MBMS notification is broadcast in the PDCCH format 1C, and the location of an MBMS sub-frame will be broadcast as broadcast information.

Control information related to the eMBMS is separate from uni-cast control information, and the majority of MBMS control information is transmitted on an MBMS-specific logic channel MCCH. An MBSFN area corresponds to an MCCH. The minority of the MBMS control information is transmitted on a BCCH to receive an MCCH.

To receive an MBMS service, the user equipment firstly fetches an SIB13 and fetches an MCCH message at a corresponding location according to MCCH configuration information in the SIB13 and then further receives the relevant MBMS service at a corresponding location according to MTCH configuration and MBMS service information in the MCCH message.

The UE is notified in broadcast information at the network side of which sub-frame is configured as an MBSFN sub-frame, and the UE for which there is no MBMS service will not demodulate the MBSFN sub-frame; and the UE will listen to only an MCCH service of a relevant MBSNF area in the case that there are a plurality of MCCHs. The SIB13 can indicate that no MBMS service is borne in a specific sub-frame even if the sub-frame is set to an MBMS sub-frame because the SIB13 indicates a mapping relationship between an MCCH and the MBMS sub-frame, and if a specific MBMS sub-frame has no MCCH mapped thereto, then it is still not necessary for the user equipment for which there is an MBMS service to demodulate the MBMS sub-frame, thus saving power of both the base station and the user equipment.

For the UE, scheduling received by the UE indicates that the sub-frame is an MBSFN the sub-frame which is actually virtual, so the UE will not receive any following data part of the sub-frame more upon reception of a control channel part thereof, and this period is a blank period of time in the downlink for the UE.

For the base station, the base station determines MBSFN downlink sub-frames in which no multicast service is borne and then sets these sub-frames to MBSFN sub-frames and signals those sub-frames, which are set to MBSFN sub-frames, to the physical layer by broadcasting the SIB13. The first one or two symbols of an MBSFN sub-frame are uni-cast symbols for boring control information, and the remaining part that follows is used as multicast symbols for MBSFN transmission, and in order to facilitate disabling of a corresponding physical channel, data at the locations in which the MBSFN multicast symbols are borne can be set to a specific value (e.g., consecutive zeros) for the purpose of identification to facilitate a check of a moment of time for initiating disabling of a radio frequency channel (e.g., a check using consecutive zeros as a flag). It is determined starting from the first symbol whether data in the frequency domain on each symbol is all-zero, and if the data on the symbol is the specific value for the purpose of identification, then an operation of disabling a radio frequency channel is performed from the symbol to the last symbol of the sub-frame; or data in the time domain can be obtained after performing Inverse Fast Fourier Transform (IFFT) on a baseband signal in the frequency domain, it is determined starting from the first symbol whether the data in the time domain on each symbol is the specific value for the purpose of identification, and if the data in the time domain on the symbol is the specific value for the purpose of identification, then an operation of disabling a radio frequency channel is performed from the symbol to the last symbol of the sub-frame. Preferably the determination being made for the first three symbols will be sufficient because an MBSFN sub-frame may include one or two symbols in which uni-cast control information is borne.

To disable a radio frequency channel, all the radio frequency channel can be disabled at a time, or the radio frequency channel can be disabled separately, that is, a small signal portion (a digital to analog converter, an analog transceiver and other analog devices) and a large signal portion (a power amplifier) of a radio frequency channel are disabled separately.

Based upon the same inventive idea, there are further provided in embodiments of the invention an energy-saving base station apparatus, an RRU and a BBU, and since these apparatuses address the problem under a similar principle to the method of energy saving of a base station in a mobile communication system, reference can be made to the implementation of the method for implementations of these apparatuses, and a repeated description thereof will be omitted here.

Figure 4:
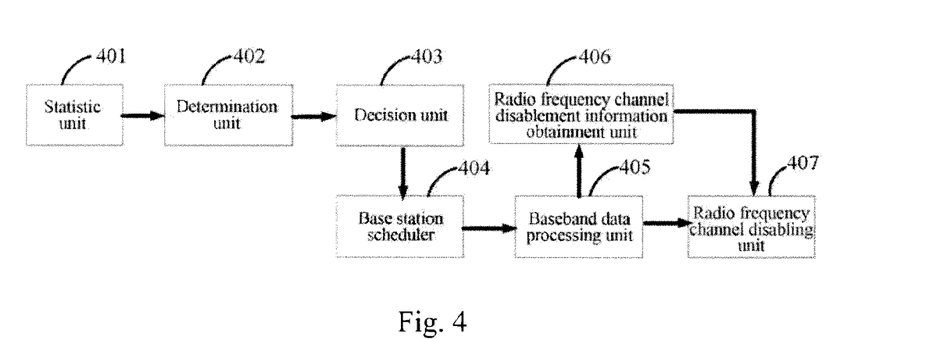
FIG. 4 is a schematic diagram of an integrated energy-saving base station apparatus according to an embodiment of the invention.

For an integrated base station, the invention proposes a specific implementation apparatus as illustrated in FIG. 4, where the base station apparatus includes a statistic unit 401, a determination unit 402, a decision unit 403, a base station scheduler 404, a baseband data processing unit 405, a radio frequency channel disablement information obtainment unit 406 and a radio frequency channel disabling unit 407.

Particularly the statistic unit 401 is configured to collect and make a statistic of downlink traffic load information of the base station and to report the information at a preset periodicity. The report periodicity can be set as needed to an integer multiple of 10 ms.

The determination unit 402 is configured to determine the traffic load average of downlink sub-frames according to the downlink traffic load information reported from the statistic unit 401, to determine whether to initiate to an operation of disabling a downlink sub-frame using an MBSFN sub-frame, and to notify the decision unit 403 of a determination result. Given a number K_DL of downlink sub-frames in a period of time, the technology of disabling a downlink sub-frame using an MBSFN sub-frame can be initiated if the traffic load average of downlink sub-frames is below a downlink sub-frame traffic load threshold×(K_DL−1)/K_DL; and a number m of MBSFN sub-frames can be set at most, if the traffic load average of downlink sub-frames is below the downlink sub-frame traffic load threshold×(K_DL−m)/K_DL, where m<K_DL. Downlink sub-frame traffic load threshold Average amount of data borne in downlink sub-fame*η, where η represents a preset load factor.

The decision unit 403 is configured to determine which downlink sub-frames are to be set to MBSFN sub-frames and to notify the base station scheduler 404 of them. The MBSFN sub-frames shall be determined taking into account an influence of a common channel, e.g., broadcast, paging, etc. The radio frequency channel disablement decision unit is configured to decide which sub-frames without downlink data transmitted therein can be set to MBSFN sub-frames and to notify the base station scheduler 404 of them.

The base station scheduler 404 is configured to determine the number of uni-cast symbols (control area symbols) included in a determined MBSFN sub-frame in which no downlink data is transmitted. There is no uni-cast symbol in the MBSFN sub-frame in which no downlink data is transmitted if neither data of a corresponding uplink sub-frame is to be scheduled nor uplink feed information ACK/NACK is to be borne in the MBSFN sub-frame in which no downlink data is transmitted. If a sub-frame bears downlink data, then the sub-frame is required to be scheduled by transferring the borne data to another available downlink sub-frame for transmission.

The baseband data processing unit 405 is configured to set data of multicast symbols of the downlink sub-frames, which can be disabled, to a specific value, which can be all-zero or all-one or can be a specific sequence to identify symbol disablement, according to a notification of the base station scheduler 404.

The radio frequency channel disablement information obtainment unit 406 is configured to detect a starting point of time at which a radio frequency channel is disabled. If baseband data of a symbol is a specific consecutive value or a sequence to identify symbol disablement, the starting time of the symbol is determined as the starting point of time for performing disablement. The determination will be made for the first three symbols at most because the first one or two symbols of an MBSFN sub-frame may be uni-cast symbols, and the sub-frame has not been set to an MBSFN sub-frame and thus no operation of disabling a symbol or a radio frequency channel will be performed if the third symbol is still not zero.

The radio frequency channel disablement information obtainment unit 406 is further configured to generate and transmit an instruction to disable a radio frequency channel possibly in the form of a switch level or another instruction form.

The radio frequency channel disabling unit 407 is configured to perform an operation of disabling a radio frequency channel, according to the starting point of time output from the radio frequency channel disablement information obtainment unit 406, from the starting point of time to the last symbol.

To disable a radio frequency channel, the radio frequency channel disabling unit 407 can disable all the radio frequency channel at a time or disable a radio frequency channel separately, that is, disable a small signal portion (a digital to analog converter, an analog transceiver and other analog devices) and a large signal portion (a power amplifier) of the radio frequency channel separately, dependent upon a varying design demand of the radio frequency channel.

In a practical application, a radio frequency device will experience a signal settling procedure from a disabling status to an operating status, so the ending time for a disabling periodicity of a sub-frame shall be advanced appropriately, typically by 1 to 5 μs dependent upon a different settlement period of time for the device.

For a base station in a distributed structure, a Radio Remote Unit (RRU) shall determine by itself when to initiate disabling of a radio frequency channel according to data transmitted from a Base Band Unit (BBU) to the RRU; or a radio frequency channel disablement information detection and notification unit may be arranged at the BBU to notify the RRU of when to disable a radio frequency channel.

Figure 5:
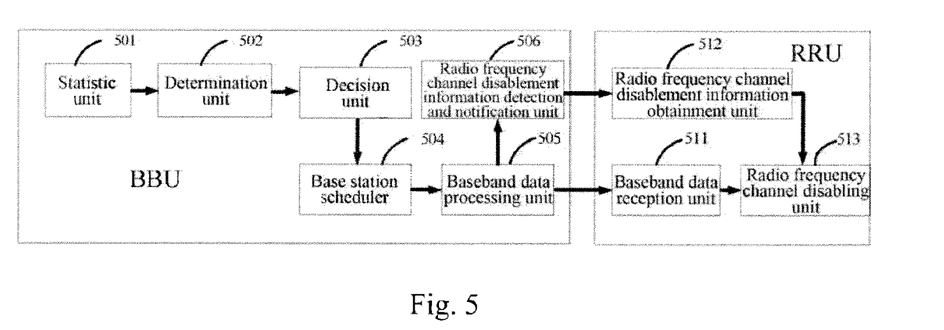
FIG. 5 is a schematic diagram of a first distributed energy-saving base station apparatus according to an embodiment of the invention.

This embodiment proposes a specific implementation apparatus as illustrated in FIG. 5, where the BBU includes a statistic unit 501, a determination unit 502, a decision unit 503, a base station scheduler 504, a baseband data processing unit 505 and a radio frequency channel disablement information detection and notification unit 506. The RRU includes a baseband data reception unit 511, a radio frequency channel disablement information obtainment unit 512 and a radio frequency channel disabling unit 513.

Particularly the statistic unit 501 is configured to collect and make a statistic of downlink traffic load information of the base station and to report the information at a preset periodicity. The report periodicity can be set as needed to an integer multiple of 10 ms.

The determination unit 502 is configured to determine the traffic load average of downlink sub-frames according to the downlink traffic load information reported from the statistic unit 501, to determine hereby whether to initiate an operation of disabling a downlink sub-frame using an MBSFN sub-frame, and to notify the decision unit 503 of a determination result. Given a number K_DL of downlink sub-frames in a period of time, the technology of disabling a downlink sub-frame using an MBSFN sub-frame can be initiated if the traffic load average of downlink sub-frames is below a downlink sub-frame traffic load threshold×(K_DL−1)/K_DL; and a number m of MBSFN sub-frames can be set at most, if the traffic load average of downlink sub-frames is below the downlink sub-frame traffic load threshold×(K_DL−m)/K_DL, where m<K_DL. Downlink sub-frame traffic load threshold=Average amount of data borne in downlink sub-fame*η, where η represents a preset load factor.

The decision unit 503 is configured to determine which downlink sub-frames are to be set to MBSFN sub-frames and to notify the base station scheduler 504 of them. The MBSFN sub-frames shall be determined taking into account an influence of a common channel, e.g., broadcast, paging, etc. The radio frequency channel disablement decision unit is configured to decide which sub-frames without downlink data transmitted therein can be set to MBSFN sub-frames and to notify the base station scheduler of them.

The base station scheduler 504 is configured to determine the number of uni-cast symbols (control area symbols) included in a determined MBSFN sub-frame in which no downlink data is transmitted. There is no uni-cast symbol in the MBSFN sub-frame in which no downlink data is transmitted if neither data of a corresponding uplink sub-frame is to be scheduled nor uplink feed information ACK/NACK is to be borne in the MBSFN sub-frame in which no downlink data is transmitted. If a sub-frame bears downlink data, then the sub-frame is required to be scheduled by transferring the borne data to another available downlink sub-frame for transmission.

The baseband data processing unit 505 is configured to set baseband data of multicast symbols of the downlink sub-frames, which can be disabled, to a specific value (which can be all-zero or all-one or can be a specific sequence to identify symbol disablement) according to a notification of the base station scheduler 504 and to transmit the baseband data to the RRU.

The radio frequency channel disablement information detection and notification unit 506 is configured to detect a starting location of multicast symbols. The first one or two symbols of an MBSFN sub-frame are uni-cast symbols for boring control information, and the remaining part that follows is used as multicast symbols for MBSFN transmission, and in order to facilitate disabling of a corresponding physical channel, data at the locations in which the MBSFN multicast symbols are borne can be set to a specific value (e.g., consecutive zeros) for the purpose of identification to facilitate a check of a point of time for disabling a radio frequency channel. It is determined starting from the first symbol whether data in the frequency domain on each symbol is all-zero, and if the data on the symbol is the specific value for the purpose of identification, then an operation of disabling a radio frequency channel is performed from the symbol to the last symbol of the sub-frame; or data in the time domain can be obtained after performing Inverse Fast Fourier Transform (IFFT) on a baseband signal in the frequency domain, it is determined starting from the first symbol whether the data in the time domain on each symbol is the specific value for the purpose of identification, and if the data in the time domain on the symbol is the specific value for the purpose of identification, then an operation of disabling a radio frequency channel is performed from the symbol to the last symbol of the sub-frame. Preferably the determination being made for the first three symbols will be sufficient because an MBSFN sub-frame may include one or two symbols in which uni-cast control information is borne. If the baseband data is the specific consecutive value or the sequence to identify symbol disablement, then the starting point of time for performing disablement is the starting point of time for the symbol and notified to the RRU, possibly by signalling the point of time to the RRU.

At the RRU, the baseband data reception unit 511 is configured to receive the baseband data from the BBU.

The radio frequency channel disablement information obtainment unit 512 is configured to receive information on the point of time for disabling a radio frequency from the BBU and to transmit a corresponding control instruction to the radio frequency channel disabling unit 513.

The radio frequency channel disabling unit 513 is configured to perform operations of enabling and disabling a radio frequency channel according to the control instruction output from the radio frequency channel disablement information obtainment unit 512.

Figure 6:
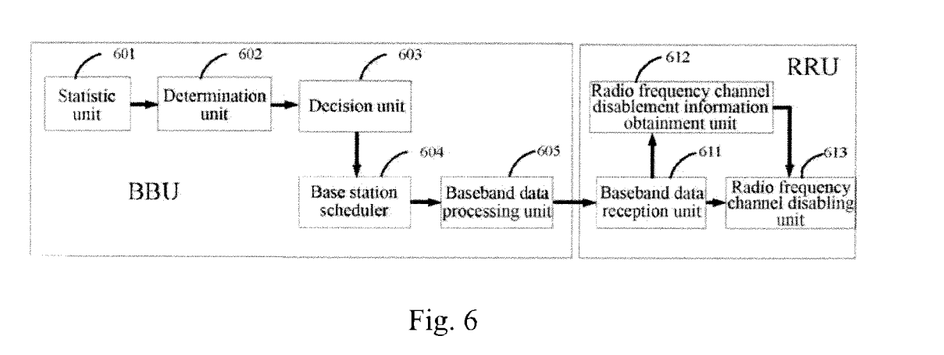
FIG. 6 is a schematic diagram of a second distributed energy-saving base station apparatus according to an embodiment of the invention.

To disable a radio frequency channel, the radio frequency channel disabling unit is controlled to disable all the radio frequency channel at a time or disable a radio frequency channel separately, that is, disable a small signal portion (a digital to analog converter, an analog transceiver and other analog devices) and a large signal portion (a power amplifier) of the radio frequency channel separately, dependent upon a varying design demand of the radio frequency channel For a distributed base station, the invention further proposes another specific implementation apparatus as illustrated in FIG. 6:

A BBU includes a statistic unit 601, a determination unit 602, a decision unit 603, a base station scheduler 604 and a baseband data processing unit 605, and an RRU includes a baseband data reception unit 611, a radio frequency channel disablement information obtainment unit 612 and a radio frequency channel disabling unit 613.

Particularly the statistic unit 601 is configured to collect and make a statistic of downlink traffic load information of the base station and to report the information at a preset periodicity. The report periodicity can be set as needed to an integer multiple of 10 ms.

The determination unit 602 is configured to determine the traffic load average of downlink sub-frames according to the downlink traffic load information reported from the statistic unit 601, to determine hereby whether to initiate an operation of disabling a downlink sub-frame using an MBSFN sub-frame, and to notify the decision unit 603 of a determination result. Given a number K_DL of downlink sub-frames in a period of time, the technology of disabling a downlink sub-frame using an MBSFN sub-frame can be initiated if the traffic load average of downlink sub-frames is below a downlink sub-frame traffic load threshold×(K_DL−1)/K_DL; and a number m of MBSFN sub-frames can be set at most, if the traffic load average of downlink sub-frames is below the downlink sub-frame traffic load threshold×(K_DL−m)/K_DL, where m<K_DL. Downlink sub-frame traffic load threshold=Average amount of data borne in downlink sub-fame*η, where η represents a preset load factor.

The decision unit 603 is configured to determine which downlink sub-frames are to be set to MBSFN sub-frames and to notify the base station scheduler 604 of them. The MBSFN sub-frames shall be determined taking into account an influence of a common channel, e.g., broadcast, paging, etc. The radio frequency channel disablement decision unit is configured to decide which sub-frames without downlink data transmitted therein can be set to MBSFN sub-frames and to notify the base station scheduler of them.

The base station scheduler 604 is configured to determine the number of uni-cast symbols (control area symbols) included in a determined MBSFN sub-frame in which no downlink data is transmitted. There is no uni-cast symbol in the MBSFN sub-frame in which no downlink data is transmitted if neither data of a corresponding uplink sub-frame is to be scheduled nor uplink feed information ACK/NACK is to be borne in the MBSFN sub-frame in which no downlink data is transmitted. If a sub-frame bears downlink data, then the sub-frame is required to be scheduled by transferring the borne data to another available downlink sub-frame for transmission.

The baseband data processing unit 605 is configured to set baseband data of the downlink sub-frames, which can be disabled, to a specific sequence to identify disabled symbols, where the specific sequence can be consecutive zeros or ones or can be a specific sequence to identify symbol disablement, according to a notification of the base station scheduler 604 and to transmit the baseband data to the RRU.

At the RRU, the baseband data reception unit 611 is configured to receive the baseband data from the BBU.

Whether to disable a radio frequency channel is decided and the proportion of sub-frames in which no downlink data is transmitted is given The radio frequency channel disablement information obtainment unit 612 is configured to detect a starting location of multicast symbols. The first one or two symbols of an MBSFN sub-frame are uni-cast symbols for boring control information, and the remaining part that follows is used as multicast symbols for MBSFN transmission, and in order to facilitate disabling of a corresponding physical channel, data at the locations in which the MBSFN multicast symbols are borne can be set to a specific value (e.g., consecutive zeros) for the purpose of identification to facilitate a check of a point of time for disabling a radio frequency channel. It is determined starting from the first symbol whether data in the frequency domain on each symbol is all-zero, and if the data on the symbol is the specific value for the purpose of identification, then an operation of disabling a radio frequency channel is performed from the symbol to the last symbol of the sub-frame; or data in the time domain can be obtained after performing Inverse Fast Fourier Transform (IFFT) on a baseband signal in the frequency domain, it is determined starting from the first symbol whether the data in the time domain on each symbol is the specific value for the purpose of identification, and if the data in the time domain on the symbol is the specific value for the purpose of identification, then an operation of disabling a radio frequency channel is performed from the symbol to the last symbol of the sub-frame. Preferably the determination being made for the first three symbols will be sufficient because an MBSFN sub-frame may include one or two symbols in which uni-cast control information is borne. If the baseband data is the specific consecutive value or the sequence to identify symbol disablement, then the starting point of time for performing disablement is the starting point of time for the symbol and a corresponding instruction to disable/enable a radio frequency channel is transmitted to the radio frequency channel disabling unit 613.

The radio frequency channel disabling unit 613 is configured to perform an operation of disabling/enabling a radio frequency channel according to the corresponding instruction to disable/enable a radio frequency channel output from the radio frequency channel disablement information obtainment unit 612.

The radio frequency channel disabling unit 613 can disable all the radio frequency channels at a time or disable a radio frequency channel separately, that is, disable a small signal portion (a digital to analog converter, an analog transceiver and other analog devices) and a large signal portion (a power amplifier) of the radio frequency channel separately, dependent upon a varying design demand of the radio frequency channels.

For a varying type of base station, the radio frequency channel disablement determination/detection unit may be located differently so that the radio frequency channel disablement determination/detection unit can be implemented at a BBU or an RRU for a distributed base station.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A method for energy saving of a base station in a mobile communication system, comprising:
   determining an average of downlink sub-frames traffic load;
   determining a Multicast Broadcast Single Frequency Network (MBSFN) downlink sub-frame in which no multicast service is borne when the average of downlink sub-frames traffic load is below a downlink sub-frame traffic load threshold; and
   disabling a radio frequency channel corresponding to multicast symbols in the MBSFN downlink sub-frame in which no multicast service is borne.

2. The method of claim 1, wherein the determining the average of downlink sub-frames traffic load comprises:
   determining the average of downlink sub-frames traffic load according to an amount of data in a downlink data buffer; or
   determining the average of downlink sub-frames traffic load according to an average amount of data in a downlink data buffer in a preset statistic period.

3. The method of claim 1, wherein the downlink sub-frame traffic load threshold is equal to the product of an average amount of data borne in a downlink sub-frame and a preset load factor.

4. The method of claim 3, wherein the greatest number of MBSFN downlink sub-frames is m when the average of downlink sub-frames traffic load is below the downlink sub-frame traffic load threshold×(K_DL−m)/K_DL, and
wherein K_DL represents the number of available downlink sub-frames, and m is below K_DL.

5. The method of claim 4, wherein for an FDD system, the MBSFN downlink sub-frame in which no multicast service is borne includes:
one or more of the sub-frame 1, the sub-frame 2, the sub-frame 3, the sub-frame 6, the sub-frame 7 and the sub-frame 8.

6. The method of claim 4, wherein for a TDD system, the MBSFN downlink sub-frame in which no multicast service is borne includes:
a downlink sub-frame at the tail of a corresponding radio frame or half-frame.

7. The method of claim 1, wherein after determining the MBSFN downlink sub-frame, the method further comprises:
scheduling data borne in the determined MBSFN downlink sub-frame to another available downlink sub-frame or allocating no data to the determined MBSFN downlink sub-frame.

8. The method of claim 6, wherein the MBSFN downlink sub-frame in which no multicast service is borne includes:
one or more of the sub-frame 3, the sub-frame 4, the sub-frame 7, the sub-frame 8 and the sub-frame 9.

9. The method of claim 1, wherein after determining the MBSFN downlink sub-frame, the method further comprises:
the base station transmitting configuration information of the MBSFN sub-frame in a broadcast message.

10. The method of claim 9, wherein the broadcast message is borne in a System Information Block Type13, SIB13.

11. The method of claim 1, wherein disabling a radio frequency channel corresponding to multicast symbols comprises:
disabling a radio-frequency small signal portion and/or a radio-frequency large signal portion for a corresponding period of time, and
wherein the radio-frequency small signal portion includes a digital to analog converter and an analog transceiver; and the radio-frequency large signal portion includes a power amplifier.

12. A base station apparatus, comprising:
a base station scheduler;
a memory; and
one or more processors, wherein:
the memory is configured to store computer readable program codes, and the one or more processors execute the compute readable program codes to implement a baseband data processing unit, wherein the one or more processors further execute the computer readable program codes to implement:
a statistic unit, a determination unit, a decision unit, a radio frequency channel disablement information obtainment unit and a radio frequency channel disabling unit, and wherein:
the statistic unit is configured to collect and make a statistic of downlink traffic load information of a base station and to report statistic result information at a preset periodicity, wherein the preset periodicity is an integer multiple of 10 ms;
the determination unit is configured to determine whether to set a Multicast Broadcast Single Frequency Network (MBSFN) downlink sub-frame in which no multicast service is borne according to the downlink traffic load information reported from the statistic unit;
the decision unit is configured to determine a downlink sub-frame which is set to the MBSFN sub-frame;
the radio frequency channel disablement information obtainment unit is configured to detect radio frequency channel disablement information; and
the radio frequency channel disabling unit is configured to perform an operation of disabling a radio frequency channel according to the radio frequency channel disablement information obtained by the radio frequency channel disablement information obtainment unit.

13. The apparatus of claim 12, wherein the baseband data processing unit is configured:
to set baseband data of multicast symbols of the MBSFN downlink sub-frame to a specific value, and
wherein the specific value is 0 or 1 or a sequence to identify symbol disablement.

14. The apparatus of claim 13, wherein the radio frequency channel disablement information obtainment unit is further configured:
to detect baseband data on each symbol starting from the first symbol and to determine a starting point of time, when the baseband data is the specific value, as a starting point of time for an instruction to disable a radio frequency channel.

15. The apparatus of claim 14, wherein the radio frequency channel disabling unit is further configured:
to perform the operation of disabling the radio frequency channel for a corresponding sub-frame period according to the starting point of time for disabling the radio frequency channel output from the radio frequency channel disablement information obtainment unit.

16. The apparatus of claim 12, wherein the statistic unit, the determination unit, the decision unit, the base station scheduler and the baseband data processing unit are arranged in a Base Band Unit, BBU; and
the radio frequency channel disablement information obtainment unit and the radio frequency channel disabling unit are arranged in a Radio Remote Unit (RRU); and
the RRU further comprises:
a baseband data reception unit configured to receive baseband data from the BBU.

17. The apparatus of claim 16, wherein the BBU further comprises:
a radio frequency channel disablement information detection and notification unit configured to detect baseband data on each symbol starting from the first symbol, to determine a starting point of time, when the baseband data is a specific value, as a starting point of time for performing disablement, and to notify the RRU of the point of time for disablement; and
wherein the radio frequency channel disablement information detection and notification unit is further configured:
to signal the point of time for disablement to the RRU.

* * * * *